(No Model.)

W. E. BADGER.
SELF LUBRICATING PULLEY.

No. 435,673. Patented Sept. 2, 1890.

WITNESSES:

INVENTOR:
W. E. Badger

UNITED STATES PATENT OFFICE.

WILLIAM E. BADGER, OF WEST QUINCY, MASSACHUSETTS.

SELF-LUBRICATING PULLEY.

SPECIFICATION forming part of Letters Patent No. 435,673, dated September 2, 1890.

Application filed March 7, 1890. Serial No. 343,019. (No model.)

*To all whom it may concern:*

Be it known that I, WILLIAM E. BADGER, of West Quincy, in the county of Norfolk and State of Massachusetts, have invented certain new and useful Improvements in Self-Lubricating Pulleys, of which the following is a specification.

This invention relates to loose pulleys of the self-lubricating type; and it consists in the improved construction hereinafter described, embodying an annular oil chamber or receptacle surrounding the hub of the pulley and a wick or capillary conductor inserted in an orifice in the hub and extending therefrom into the oil-chamber, the said wick being arranged to conduct oil from the chamber to the periphery of the shaft within the hub, while the hub is open at its ends to permit the oil to drop back therefrom into the oil-chamber, as I will now proceed to describe and claim.

Figure 1:
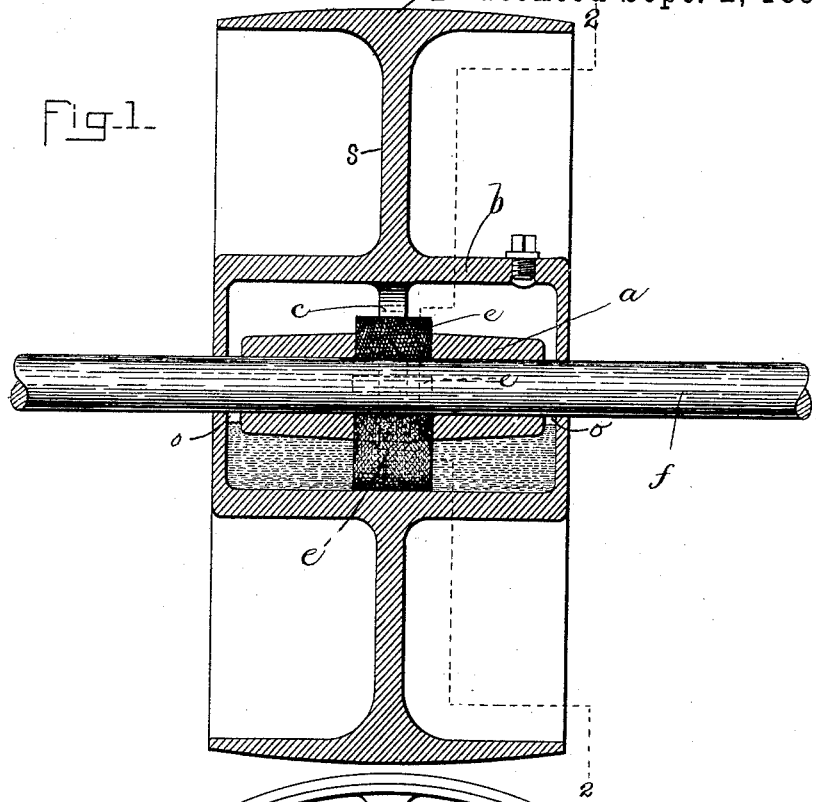
Figure 2:
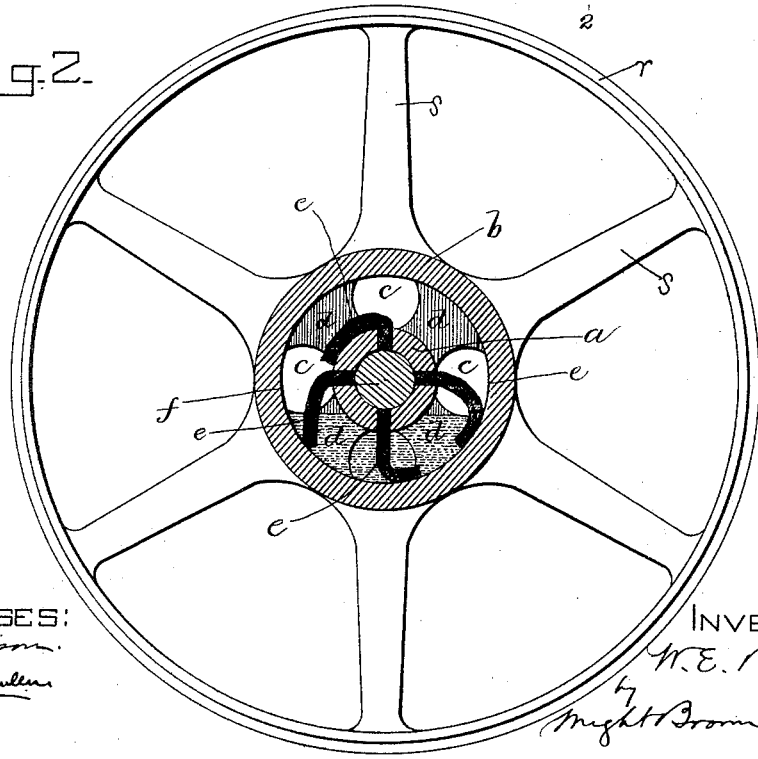

In the accompanying drawings, forming a part of this specification, Figure 1 represents a sectional view of my improved pulley, taken lengthwise of the hub. Fig. 2 represents a section on line 2 2, Fig. 1.

The same letters of reference indicate the same parts in both the figures.

In the drawings, $a$ represents the hub of my improved pulley, and $b$ represents the oil-chamber, which is connected with the central portion of the hub by a web or spider having openings $c\ c$ for the circulation of oil through the chamber from end to end, the portions of the connecting-web between said openings constituting arms $d\ d$, said arms, the hub, and the chamber $b$ being preferably cast in one piece, which also includes the pulley-rim $r$ and the spokes $s$, that connect the latter with the chamber $b$. The chamber $b$ forms an annular space around the hub $a$ and is arranged to catch any oil that may escape from any part of the hub.

$e$ represents a wick or capillary conductor, one end of which is inserted in an orifice formed for it in the hub $a$ about midway between the ends thereof, the other end of the wick extending outwardly from the hub into the oil-chamber, so that the wick is adapted to conduct oil from the chamber to the interior of the hub, and thereby lubricate the bearing-surfaces of the hub and of the shaft $f$. It will be seen that when the pulley is rotating loosely on the shaft $f$ the outer portion of the wick $e$ will be in contact with the oil in the chamber $b$ and will conduct a sufficient quantity of the oil into the hub to lubricate the bearing-surfaces. The capillary action of the wick is sufficient to overcome the tendency of the oil to fly outwardly by centrifugal force. Hence there will be no failure to properly lubricate the contacting-surfaces of the shaft and hub. The oil thus entering the hub at about the center of its length flows outwardly to its ends, which are separated from the ends of the chamber $b$ by openings $o\ o$, Fig. 1, which permit the oil to fall from the ends of the hub back to the accumulation of oil in the chamber. A constant circulation of oil is thus maintained, the oil entering the hub at its middle portion and flowing outwardly to its ends, where the surplus oil returns to the reservoir.

I am aware that the hub of a loose pulley has been surrounded by an annular oil-chamber, said hub being provided with channels extending from the oil-chamber to the inner surface of the hub to conduct oil from the chamber to the bearing-surfaces of the hub and shaft; but so far as I am aware a hub surrounded by an oil-chamber and provided with an oil-conducting channel has never been provided with a wick inserted at one end in said channel, its other end projecting into the oil-chamber. The advantage of a wick in overcoming the tendency of the oil to move outwardly or away from the bearing-surfaces will be obvious. It will be seen that when the pulley is held stationary and the shaft is rotated within it, the wick $e$, if in contact with the oil at its outer end, will conduct oil to the shaft and keep the bearing-surfaces lubricated the same as when the pulley is rotating.

To insure the oiling action when the pulley is held stationary, I prefer to use two or more wicks, the same projecting in different directions, so that one wick will be sure to be in the lower part of the oil-chamber in any position in which the pulley may be stopped.

I claim—

The herein-described self-lubricating pulley, comprising the hub having openings $o\ o$ at its ends, the annular oil-chamber located within and rigidly connected with the rim of the pulley and provided at its ends with orifices for the shaft on which the pulley is mounted and inclosing said hub, the central spider or web connecting said hub to said oil-chamber and having a series of openings $c$, and one or more wicks inserted in an orifice or orifices in the central portion of the hub and extending from the inner surface of the hub outwardly into the oil-chamber, said wicks conducting oil to the central portion of the hub, from whence the oil flows outwardly to the ends, the surplus oil falling back into the reservoir through the said openings $o$, as set forth.

In testimony whereof I have signed my name to this specification, in the presence of two subscribing witnesses, this 28th day of February, A. D. 1890.

WILLIAM E. BADGER.

Witnesses:
C. F. BROWN,
A. D. HARRISON.